May 28, 1957  H. T. FAUS ET AL  2,794,137
SELF-STARTING SYNCHRONOUS MOTOR
Filed Dec. 8, 1955  2 Sheets-Sheet 1

Inventors:
Harold T. Faus
Frederick R. Sias
John R. Macintyre
by, *Richard E. Hosley*
Their Attorney May 28, 1957  H. T. FAUS ET AL  2,794,137
SELF-STARTING SYNCHRONOUS MOTOR
Filed Dec. 8, 1955  2 Sheets-Sheet 2

Inventors:
Harold T. Faus
Frederick R. Sias
John R. Macintyre
by, Richard E. Horley
Their Attorney

United States Patent Office 2,794,137
Patented May 28, 1957

2,794,137

SELF-STARTING SYNCHRONOUS MOTOR

Harold T. Faus, Lynn, Frederick R. Sias, Lynnfield Center, and John R. Macintyre, Peabody, Mass., assignors to General Electric Company, a corporation of New York Application December 8, 1955, Serial No. 551,780

4 Claims. (Cl. 310—164)

This invention relates to small, self-starting synchronous motors in which the rotor is in the form of a permanent magnet and the field structure includes two sets of annularly arranged, interspersed field poles of opposite instantaneous polarity.

It is an important object of the invention to provide such a motor that may be manufactured at low cost, that is reliable in starting and running under a wide variety of conditions, and that provides high torque for both starting and running of the motor.

In accordance with the invention, a novel configuration has been devised for the rotor poles, combining reliability of starting with high running torque, and a novel configuration has been devised for the field poles, intended to cooperate with the novel rotor to minimize bearing friction and to allow the rotor to more readily and positively position itself for reliable starting upon de-energization of the field structure.

The object of the invention, as well as the benefits and advantages attendant thereto, will be more readily understood upon reference to the description set forth below, particularly when taken in conjunction with the drawings annexed hereto, in which.

Figure 1:
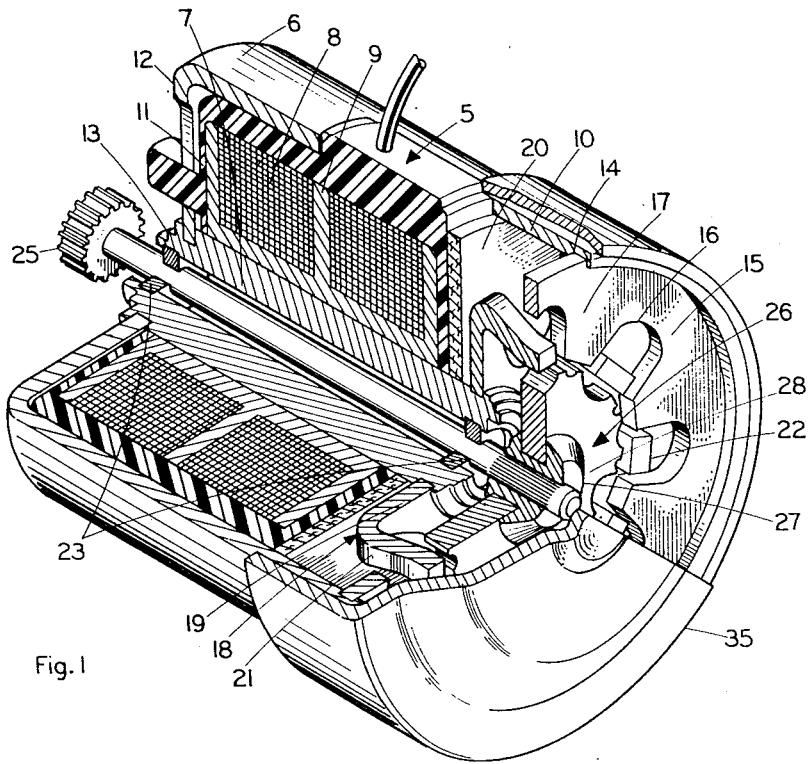
Figure 1 is a cutaway view, in perspective, of the motor forming the subject invention.

Referring first to Figure 1, there is shown an enlarged view of the synchronous motor forming the subject invention, illustrating nicely the compact and simple design intended to provide a rugged, long-life, high torque, low-cost motor.

The motor is substantially cylindrical in form and includes a hollow field coil 5 nested within a cup-shaped magnetic member 6 and surrounding a hollow magnetic core 7. The coil has suitable conductors generally indicated at 8, suitably wound on a supporting spool structure 9, after which the wound coil is completely surrounded by suitable insulating material 11, such as nylon or the like, which, in the embodiment illustrated, may be applied thereto by conventional molding techniques.

The cup 6 is provided with an elongated slot 10 extending from its open end toward its base, and the insulation material 11 forming a part of the field coil 5 has a projection 11a thereon adapted to nest within the slot 10 and key the coil to the cup. If desired, the base of the cup may be apertured to receive another projection 11b of insulation material to further key the parts together. The projection 11a serves the additional purpose of providing a suitable outlet for the electrical leads connected to the coil 5.

The cup 6 has its closed end in the form of a base member 12 provided with a centrally located aperture for receiving therethrough the reduced end 13 of the core 7. The core and the cup are rigidly secured together by any suitable means such as staking or the like.

The outer end of the cup 6 is provided with a shoulder 14 completely surrounding its periphery and adapted to receive a magnetic member in the form of a disk 15. The disk is rigidly affixed to the cup by spinning over the outer edge of the cup as shown. It is noted that disk 15 has a centrally located aperture surrounding which is a series of notches 16, between which are formed a set of field poles 17.

On the outer end of core 7, separated from coil 5 by a washer 20 of suitable electrical insulation material, there is staked thereto a magnetic member in the form of a spider 18 having an annular hub portion 19 from which project, at spaced peripheral points, a plurality of fingers 21, each of which extends radially outward from the core for a predetermined distance after which each are bent inwardly to extend toward the plate 15 in both an axial and radial direction. The fingers have tips 22 extending between the poles 17 in an axial direction only to form a second set of field poles for the motor.

From the above, it is seen that the magnetic circuit for the coil 5 comprises the cup 6, its base 12, core 7, spider 18, fingers 21, finger tips 22 forming one set of field poles, an air gap, poles 17, and thence through the plate 15 back to the cup 6. Since the magnetic flux traversing the field structure passes from one set of poles to the other in any instant of travel through the field structure, it is apparent that the poles 17 and 22 are always of opposite instantaneous polarity; that is, adjacent field poles in the complete field structure are always of opposite instantaneous polarity.

Supported within the hollow core 7 and journalled for rotation with respect thereto by the annular bearing members 23, staked to the core, is a shaft 24, to the inner end of which may be suitably affixed a pinion 25 and to which is affixed on its outer end a rotor 26. The rotor 26 is a permanent magnet and may be formed by casting a suitable permanent magnet material, such as one of the well known alnico magnetic materials, integrally with a suitable die cast hub portion 27 after which the rotor is assembled to the shaft 24 by a suitable press fit or the like.

Figure 2:
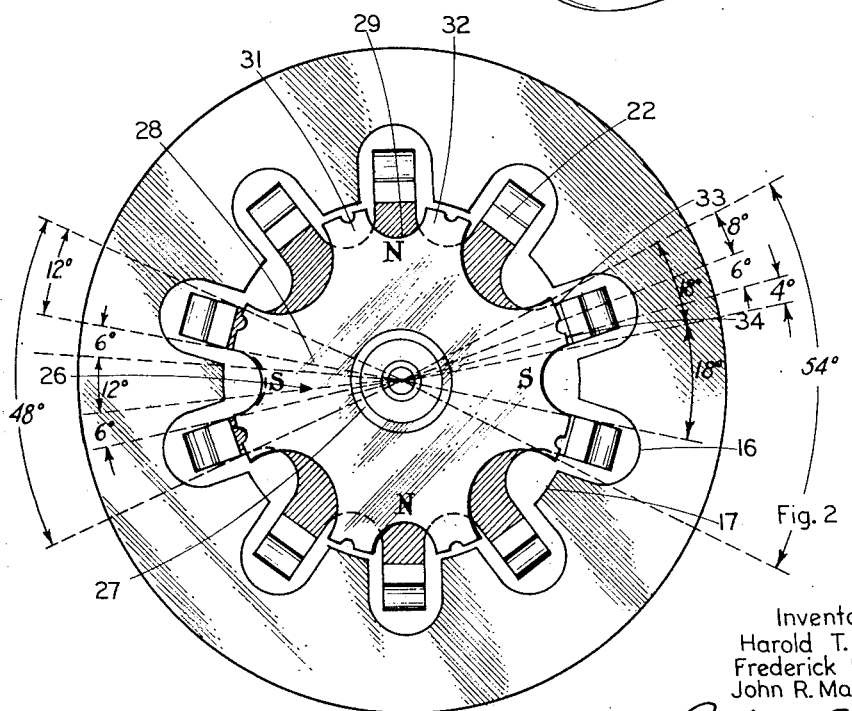
Figure 2 is an end view of the motor shown in Figure 1.

In Figure 2, it is seen that the rotor has a plurality of poles 28, adjacent ones of which are of opposite polarity. For example, in the view shown in Figure 2, the upper pole may be north, the next one—in a clockwise direction—south, the lower, north, and the remaining, south. Each pole spans at least three field poles and is provided with a centrally disposed primary notch 29 dividing the poles into a pair of identical pole tips 31.

Each of the pole tips is in turn provided with a secondary notch 32 dividing the pole tips into pole sections 33, 34 of unequal width, that is, the notches are arranged off-center between the edges of the pole tips.

To complete the motor, a cap 35 of non-magnetic material is slipped over the open end of cup 6 to form therewith the motor casing.

Referring again to Figure 2, which shows an instantaneous running position of the rotor 26, it is seen that each of the rotor poles 28 span three of the field poles, each end of the rotor poles extending half way across the air gap separating the ends of the three poles spanned from the field poles on either end thereof. In the embodiment illustrated, the ends of the rotor poles are spaced 54° apart whereas the ends of any three consecutive field poles are spaced 48° apart, each field pole defining an angle of 12° and adjacent field poles being spaced 6° apart by the air gap.

Each of the rotor pole tips 31 has its edges spaced 18° apart, the primary notches 29 also defining an angle of 18°. The secondary notches 32 define an angle of 6° and are offset in a clockwise direction from the center of pole tips 31 by an angle of 2°, thus dividing each rotor pole tip into pole sections 33 and 34 defining angles of 8° and 4°, respectively.

The secondary notches 32 are of paramount importance in the attainment of reliable self-starting, for they divide the pole tips into discrete pole sections that seek a position of minimum reluctance opposite adjacent field poles upon de-energization of field coil 5. This arrangement has the effect of providing substantially increased starting torque over a rotor without the secondary notches, and, in addition, also provides substantially increased running torque for the motor. To make this increased starting torque function at all times to provide reliable starting of the motor, the secondary notches must be located in the off-center position shown, for if the notches were centered in the rotor pole tips, the rotor could lock upon energization of the field structure.

Figure 4:
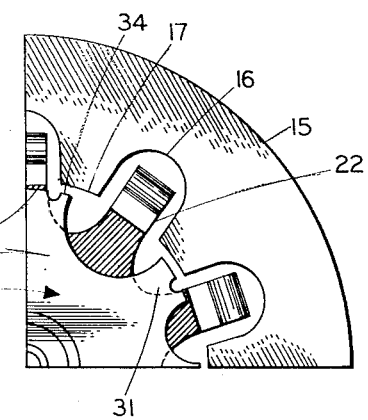
Figure 4 is a partial end view of the motor, showing the relative position of the rotor when the field structure is de-energized.

Figure 4 shows the rotor in its position of minimum reluctance, with the field coil 5 de-energized, and perhaps the best way to understand the effect produced by offsetting the notches 32, is to first consider the action that would occur with the notches 32 centered in the pole tips 31.

Thus, using Figure 4 as a guide, and assuming the rotor to be modified by having the notches 32 located centrally in pole tips 31, and assuming further that the upper rotor pole, a portion of which shows in Figure 4, is polarized north and the pole to its right is polarized south, it is apparent that such a rotor, upon de-energization of the motor field coil, would seek a position wherein its secondary notches 32 were opposite the air gaps between field poles 17 and 22. In such a position, the pole sections on opposite sides of the notch would underlie the field poles 17 and 22, in a manner similar to the arrangement shown in Figure 4.

Now, assuming the field coil to be energized slowly, that is, with a gradually increasing field current, and assuming further that upon energization of the coil, the poles 17 will have instantaneous north polarity and the poles 22 will have instantaneous south polarity, it is apparent that the south pole tip 31 will move in a counterclockwise direction to line itself up with north pole 17. Once it is so aligned, it will be symmetrically arranged with respect to pole 17, and since there will be no torque produced to drive the rotor from this position, it could lock in place. Once the rotor locks, it will remain locked for all magnitudes and polarities of field current, for the symmetrical arrangement of the pole tips relative to the poles will not produce any driving torque from either the rotor flux or the field flux.

Now, with the secondary notches 32 offset, and with the same polarities as above, the rotor will assume the position of minimum reluctance shown in Figure 4 upon de-energization of the field coil. When the field coil is energized, the pole tip 31 will again move in a counterclockwise direction to line itself up with the field pole 17. Such alignment will occur, but instead of being symmetrically aligned with the pole 17, the pole tip will be offset somewhat because of the offset disposition of notch 32. As the flux in pole 17 decays to zero upon reversal of the field current, the rotor flux, being unsymmetrically distributed across the gap between the pole tip and the pole, will produce a driving torque turning the rotor back to its position of minimum reluctance. When the field current passes through zero and begins the second half of its alternating cycle, the instantaneous polarities of poles 17 and 22 will reverse, being south and north respectively, and the pole tip 31 will turn in a clockwise direction to line itself up with pole 22. Here again, and assuming that the pole tip moves only enough to align itself with pole 22, then upon decay of the field flux to zero, which occurs when the field current completes the second half of its alternating cycle, the rotor flux will again produce a driving torque turning the rotor to its position of minimum reluctance.

Thus, even with very low field currents energizing the motor, the rotor will not lock but will oscillate until such time as the field strength builds up enough to kick it away from its position of minimum reluctance, after which it will run continuously at synchronous speeds. If the full field current is applied to the motor upon energization thereof, the field torque will probably instantaneously kick the rotor away from its position of minimum reluctance, allowing the motor to start instantaneously without any oscillation of the rotor.

When it starts, the rotor can go in either of two directions, but to allow it to have a predetermined direction of rotation, a suitable one-way gear may be embodied as a part of the external gear train connected to the motor pinion.

In addition to the novel rotor configuration devised to give the motor a reliable self-starting characteristic, it is important that the rotor be supported in such a way that bearing friction is minimized; otherwise, if friction were present in the bearings to any considerable extent, it could cancel out the benefits achieved through the novel rotor configuration, thus eliminating the reliable starting characteristic. The presence of friction in the rotor shaft mounting arrangements would not necessarily prevent the motor from starting at all times, but it is entirely possible that there would be occasions when the motor would not start. Since it is highly important that the motor start under any conditions and at any instant of energization of its field coil, it is apparent that the reduction of starting friction is of paramount importance.

Friction has been minimized by shaping the spider fingers 21 and their associated tips 22 in such a way that a magnetic suspension is provided for the rotor, thus eliminating the need for conventional friction producing thrust bearings usually found in motors of the type under consideration. The magnetic suspension permits the rotor to float in its bearings 23 and this floating arrangement minimizes any friction forces which could affect the starting of the motor. Moreover, the magnetic suspension permits the rotor to more readily align itself, both axially and radially, in the position of minimum reluctance necessary for the achievement of reliable self-starting.

Figure 3:
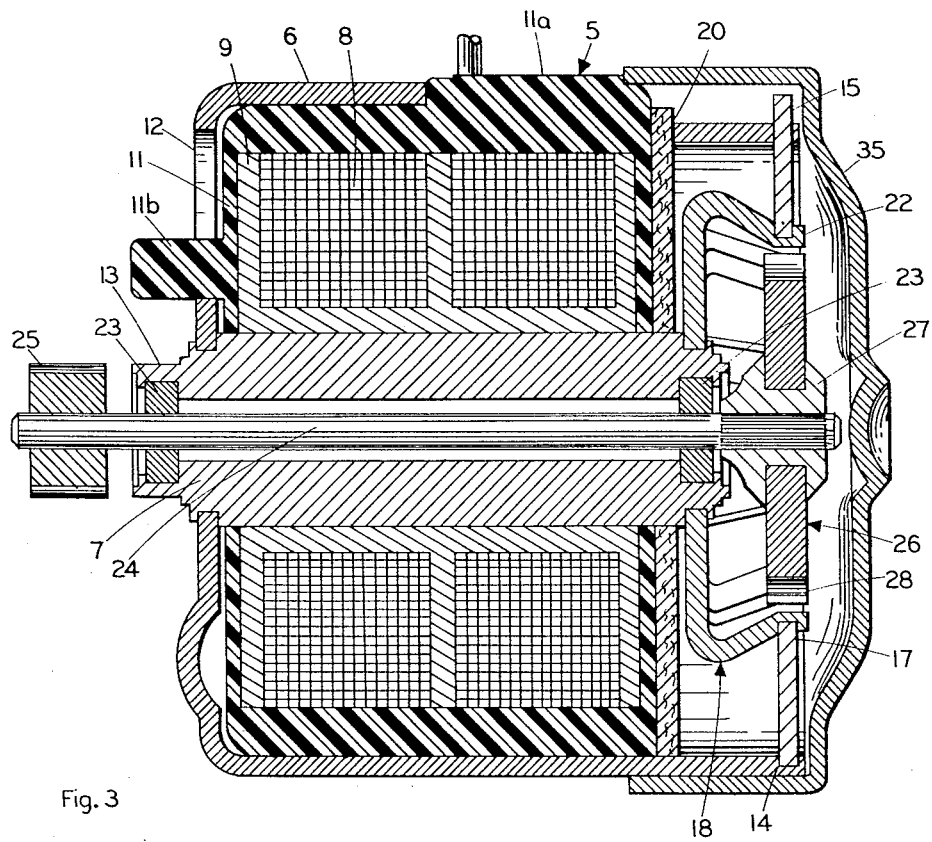
Figure 3 is a side sectional view of the motor shown in Figure 1.

The magnetic suspension is best illustrated in Figure 3 wherein it is seen that the finger tips 22 extend in an axial direction only and the remainder of the fingers 21 extend away from the rotor in both an axial and a radial direction; thus, the minimum air gap between the rotor and the fingers 21 is immediately underneath the finger tips 22, and it is this position that the rotor will always seek upon de-energization of the field coil 5. If there were any tendency for the rotor to move toward the spider hub, it would be moving in the direction of the constantly increasing air gap between it and the extremities of the spider fingers; however, it is a well known fact that magnetic members will seek a position of minimum reluctance, and since this position is immediately underneath the finger tips 22, there will be no tendency for the rotor to back in against the spider hub in which position it could easily remain locked against any starting torques.

In a like manner, if the rotor tends to move outwardly from the finger tips, it will again be leaving its position of minimum reluctance with respect to the finger tips 22 and for the reasons discussed above, it is apparent that such motion will not occur.

By permitting the tips 22 to project slightly outwardly in an axial direction from the pole plate 15, and having the axial length of the tips 22 less than the thickness of the rotor, it is apparent that the rotor will seek a predetermined axial position upon de-energization of field coil 5 and this position will be one for maximum starting torque. In this position, the rotor hub will be axially spaced from the bearing 23 and the outer end of the rotor shaft will be axially spaced from the cap 35.

From the above, it is apparent that the shaping of the finger tips 22 not only provides for a frictionless magnetic suspension of the rotor, but it also enables the rotor to position itself in a positive manner for maximum starting torque.

Thus, there has been described an improved self-starting synchronous motor. The various parts making up the compelte assembly are readily manufactured by conventional, low cost, mass production techniques and the assembly of these parts to form a complete motor is an extremely simple manufacturing operation, primarily in view of the manner in which the parts fit readily together. All of the component parts are of rugged design and construction, resulting in a rugged, long-life motor. In the illustrated form of the invention, the overall length and diameter of the motor casing are both approximately one and one-quarter inches, thus evidencing the compact arrangement achieved through the design devised for the component parts of the assembly.

Positive, reliable starting is an important characteristic of the motor and the combination of the novel rotor configuration with the frictionless, magnetic suspension devised for the rotor, not only enhances the starting characteristic, but also serves further to enhance the running torque available from the motor.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What we claim as new and desire to secure by Letters Patent of the United States is:

1. A self-starting alternating current motor including, in combination: a field structure including two magnetic members having sets of annularly arranged spaced interspersed portions forming the field poles of said motor, means for magnetizing said field structure whereby adjacent poles have opposite instantaneous polarities, a permanent magnet rotor journalled for rotation and having a plurality of spaced rotor poles arranged annularly in proximity to said field poles, adjacent rotor poles having opposite polarities, each of said rotor poles being wide enough to span at least three field poles and having a centrally disposed primary notch for dividing each pole into a pair of spaced pole tips, each of said pole tips being wide enough to span at least one field pole and having a notch dividing each pole tip into a pair of spaced pole sections of unequal width, said magnetic members having their interspersed portions proximate to said rotor formed to provide a reluctance path with said rotor poles lower than the reluctance path between any other portions of said magnetic members and said rotor whereby said rotor is positioned relative to said field poles by the magnetic forces acting between said rotor and said interspersed portions of said magnetic members.

2. A self-starting alternating current motor including, in combination: a field structure including two magnetic members having sets of annularly arranged spaced interspersed portions forming the field poles of said motor, means for magnetizing said field structure whereby adjacent poles have opposite instantaneous polarities, a permanent magnet rotor journalled for rotation and having a plurality of spaced rotor poles arranged annularly in proximity to said field poles, adjacent rotor poles having opposite polarities, each of said rotor poles being wide enough to span at least three field poles and having a centrally disposed primary notch for dividing each pole into a pair of spaced pole tips, each of said pole tips being wide enough to span at least one field pole and having a notch dividing each pole tip into a pair of spaced pole sections of unequal width, one of said magnetic members having its interspersed portions and its portions adjacent thereto extending toward said rotor in a radial direction only, the other of said magnetic members having its interspersed portions extending toward said rotor in an axial direction only, the portions adjacent said interspersed portions of said other magnetic member extending toward said rotor in both an axial and a radial direction, said arrangement of said magentic members cooperating with said rotor to provide bearing means serving to position said rotor axially with respect to said field poles.

3. A self-starting alternating current motor including, in combination: a field structure including first and second magnetic members and a field coil, said first magnetic member comprising a cylindrical cup closed at its inner end and having its outer end in the form of a disc provided with a centrally disposed annular aperture, said disc having a series of evenly spaced notches extending around the periphery of said aperture to form a plurality of evenly spaced first field poles, said second magnetic member comprising a hollow core located within said cup and extending coaxially therewith, said core having its inner end affixed to the closed end of said cup and having its outer end terminating short of said disc, said outer end of said core having a spider affixed thereto, said spider having an annular hub portion affixed to the outer end of said core from which project a plurality of peripherally arranged evenly spaced fingers, said fingers having their end portions bent over and extending generally axially toward said disc, the tips of said fingers being positioned within said disc notches to form a plurality of evenly spaced second field poles, said field coil surrounding said core and lying within said cup between said spider and the closed end of said cup, said first and second field poles having instantaneous opposite polarity when said field coil is energized, a rotatable shaft extending coaxially within said core member, journalling means supporting said shaft in spaced relation to said core member, and a permanent magnet rotor affixed to said shaft and positioned within the aperture in said disc, said rotor having a plurality of spaced rotor poles arranged annularly in proximity to said field poles, adjacent rotor poles having opposite polarities, each of said rotor poles being wide enough to span at least three field poles and having a centrally disposed primary notch for dividing each pole into a pair of spaced pole tips, each of said pole tips being wide enough to span at least one field pole and having a notch dividing each pole tip into a pair of spaced pole sections of unequal width, said finger tips extending in an axial direction only proximate to said rotor poles, said portions of said fingers adjacent said tips extending outwardly and rearwardly from said rotor in both axial and radial directions whereby said first and second field poles cooperate with said rotor poles to provide a path of minimum reluctance, said rotor being positioned axially with respect to said field poles by the magnetic forces traversing said path of minimum reluctance.

4. The combination defined by claim 3 wherein the extremities of said finger tips extend outwardly from both said rotor and said disc in an axial direction for a slight distance.

References Cited in the file of this patent

UNITED STATES PATENTS

| 1,977,185 | Haydon | Oct. 16, 1934 |
| 2,677,776 | Kolhagen | May 4, 1954 |

FOREIGN PATENTS

| 356,829 | Germany | Jan. 22, 1921 |
| 489,246 | Great Britain | July 22, 1938 |